(12) United States Patent
Zhang et al.

(10) Patent No.: US 12,051,265 B2
(45) Date of Patent: Jul. 30, 2024

(54) FINGERPRINT PROMPT PATTERN DISPLAY METHOD, FINGERPRINT IN DISPLAY UNLOCKING METHOD, AND APPARATUS

(71) Applicant: Huawei Technologies Co., Ltd., Shenzhen (CN)

(72) Inventors: Yuxi Zhang, Shanghai (CN); Yan Wang, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 38 days.

(21) Appl. No.: 17/641,318

(22) PCT Filed: Aug. 19, 2020

(86) PCT No.: PCT/CN2020/110097
§ 371 (c)(1),
(2) Date: Mar. 8, 2022

(87) PCT Pub. No.: WO2021/047360
PCT Pub. Date: Mar. 18, 2021

(65) Prior Publication Data
US 2022/0343692 A1 Oct. 27, 2022

(30) Foreign Application Priority Data
Sep. 11, 2019 (CN) .......................... 201910859806.9

(51) Int. Cl.
*G06V 40/13* (2022.01)
*G06F 21/32* (2013.01)
(Continued)

(52) U.S. Cl.
CPC .......... *G06V 40/1318* (2022.01); *G06F 21/32* (2013.01); *G06F 21/44* (2013.01);
(Continued)

(58) Field of Classification Search
CPC ............... G06V 40/1318; G06V 40/67; G06V 40/1365; G06V 40/60; G06F 21/32; G06F 21/44
See application file for complete search history.

(56) References Cited

U.S. PATENT DOCUMENTS

| 2014/0168121 A1* | 6/2014 | Chou | G06V 40/67 |
| | | | 345/173 |
| 2015/0074615 A1* | 3/2015 | Han | H04W 12/06 |
| | | | 715/863 |

(Continued)

FOREIGN PATENT DOCUMENTS

| CN | 108108701 A | 6/2018 |
| CN | 108596124 A | 9/2018 |

(Continued)

OTHER PUBLICATIONS

PConline Original, "Can save power and burn screen! AMOLED screen mobile phone must-have App," https://pcedu.pconline.com.cn/700/7000416.html, Sep. 25, 2015, 3 pages.

*Primary Examiner* — Stephen G Sherman
(74) *Attorney, Agent, or Firm* — Conley Rose, P.C.

(57) ABSTRACT

A fingerprint prompt pattern display method includes obtaining a first trigger instruction, where the first trigger instruction is used to instruct to display a fingerprint prompt pattern; and displaying N preset fingerprint prompt patterns in a fingerprint prompt area in turn, where display positions of displaying the N fingerprint prompt patterns in the fingerprint prompt area do not completely overlap, and N is an integer greater than or equal to 2.

20 Claims, 5 Drawing Sheets

(51) Int. Cl.
*G06F 21/44* (2013.01)
*G06V 40/12* (2022.01)
*G06V 40/60* (2022.01)

(52) U.S. Cl.
CPC .......... *G06V 40/1365* (2022.01); *G06V 40/60* (2022.01); *G06V 40/67* (2022.01)

(56) References Cited

U.S. PATENT DOCUMENTS

| | | |
|---|---|---|
| 2015/0116218 A1 | 4/2015 | Yang et al. |
| 2016/0117545 A1* | 4/2016 | Chiang .............. G06V 40/1365 382/124 |
| 2017/0063851 A1* | 3/2017 | Kim .................... H04W 12/065 |
| 2019/0114458 A1 | 4/2019 | Cho et al. |
| 2020/0022084 A1 | 1/2020 | Zhang |
| 2021/0012080 A1 | 1/2021 | Fan |
| 2021/0256283 A1 | 8/2021 | Liu et al. |

FOREIGN PATENT DOCUMENTS

| | | |
|---|---|---|
| CN | 109343759 A | 2/2019 |
| CN | 110147751 A | 8/2019 |
| EP | 2866165 A1 | 4/2015 |
| EP | 3226174 A1 | 10/2017 |
| WO | 2018195921 A1 | 11/2018 |
| WO | 2019041884 A1 | 3/2019 |

\* cited by examiner

FINGERPRINT PROMPT PATTERN DISPLAY METHOD, FINGERPRINT IN DISPLAY UNLOCKING METHOD, AND APPARATUS

CROSS-REFERENCE TO RELATED APPLICATIONS

This is a U.S. National Stage of International Patent Application No. PCT/CN2020/110097 filed on Aug. 19, 2020, which claims priority to Chinese Patent Application No. 201910859806.9 filed on Sep. 11, 2019. Both of the aforementioned applications are hereby incorporated by reference in their entireties.

This application claims priority to Chinese Patent Application No. 201910859806.9, filed with the China National Intellectual Property Administration on Sep. 11, 2019 and entitled "FINGERPRINT PROMPT PATTERN DISPLAY METHOD, FINGERPRINT ON DISPLAY UNLOCKING METHOD, AND APPARATUS", which is incorporated herein by reference in its entirety.

TECHNICAL FIELD

This application relates to the field of electronic technologies, and in particular, to a fingerprint prompt pattern display method, a fingerprint on display unlocking method, and an apparatus.

BACKGROUND

Fingerprint on display unlocking collects a fingerprint of a user by using a fingerprint recognition component disposed below a display and performs verification. In comparison with a button-type fingerprint unlocking method, during fingerprint on display unlocking, it is difficult for a user to quickly and accurately locate a position of the fingerprint recognition component below the display.

To facilitate a user operation and enable a user to quickly and accurately perform fingerprint on display unlocking in a preset area, currently, a fingerprint prompt pattern is usually displayed on a display of a terminal device, to guide the user to press an area corresponding to the fingerprint prompt pattern, so that a fingerprint image is collected. It should be noted that displaying a same fingerprint prompt pattern for a long time on the display reduces a service life of a display device that has been lighted up for a long time in a display area.

SUMMARY

Embodiments of this application provide a fingerprint prompt pattern display method, a fingerprint on display unlocking method, and an apparatus, to prolong a service life of a display device in a fingerprint prompt area.

According to a first aspect, an embodiment of this application discloses a fingerprint prompt pattern display method. The method includes:

obtaining a first trigger instruction, where the first trigger instruction is used to instruct to display a fingerprint prompt pattern; and displaying N preset fingerprint prompt patterns in a fingerprint prompt area in turn, where display positions of displaying the N fingerprint prompt patterns in the fingerprint prompt area do not completely overlap, and N is an integer greater than or equal to 2.

According to the technical solution provided in this embodiment of this application, when the fingerprint prompt pattern is displayed, a plurality of fingerprint prompt patterns are displayed in turn, and display positions of displaying the plurality of fingerprint patterns in the fingerprint prompt area do not completely overlap. Therefore, when the fingerprint prompt pattern is displayed, a display device that displays the fingerprint prompt pattern is prevented from being always in a lighted state. Therefore, the fingerprint prompt pattern display method provided in this application prolongs a service life of the display device in the fingerprint prompt area.

In some possible implementations, when the N fingerprint prompt patterns are displayed in the fingerprint prompt area, display positions of fingerprint prompt patterns displayed adjacent to each other do not overlap at all.

Because the display positions of the fingerprint prompt patterns displayed adjacent to each other do not overlap at all, a same display device is prevented from being lighted up in the fingerprint prompt patterns displayed adjacent to each other.

In some possible implementations, when the N fingerprint prompt patterns are displayed in the fingerprint prompt area, display positions do not overlap at all.

Because display positions of a plurality of preset fingerprint prompt patterns do not overlap at all, a same display device is prevented from being lighted up in any round of display. Therefore, the fingerprint prompt pattern display method provided in this embodiment prolongs a service life of the display device in the fingerprint prompt area.

In some possible implementations, colors of adjacent fingerprint prompt patterns in the N fingerprint prompt patterns displayed in turn are different.

Because the colors of the adjacent fingerprint prompt patterns are different, display statuses of a same display device are different, so that a service life of the display device is prolonged.

In some possible implementations, a proportion of blue pixels in any one of the N fingerprint prompt patterns is less than a preset value.

Because blue light harms eyes, limiting the proportion of blue pixels in the fingerprint prompt pattern to be less than the preset value protects eyes of a user.

In some possible implementations, the N preset fingerprint prompt patterns are classified into M groups, each group of fingerprint prompt patterns are superimposed to obtain a combination pattern corresponding to each group, and a proportion of an intersection of adjacent combination patterns in the fingerprint prompt area is less than a preset value.

In some possible implementations, there is visually no obvious shape difference in the fingerprint prompt patterns displayed adjacent to each other.

According to a second aspect, an embodiment of this application discloses a fingerprint prompt pattern display apparatus. The apparatus includes:

a first obtaining unit, configured to obtain a first trigger instruction, where the first trigger instruction is used to instruct to display a fingerprint prompt pattern; and a display unit, configured to display N preset fingerprint prompt patterns in a fingerprint prompt area in turn, where display positions of displaying the N fingerprint prompt patterns in the fingerprint prompt area do not completely overlap, and N is an integer greater than or equal to 2.

According to the technical solution provided in this embodiment of this application, display positions do not completely overlap. Therefore, when the fingerprint prompt pattern is displayed, the following problem existing when a fingerprint prompt pattern is displayed in a fingerprint display technical solution is avoided because the plurality of fingerprint prompt patterns are displayed in turn: A display device that displays the plurality of fingerprint patterns in the fingerprint prompt area is always in a lighted state. Therefore, using the fingerprint prompt pattern display apparatus provided in this application to display the fingerprint prompt pattern prolongs a service life of the display device in the fingerprint prompt area.

In some possible implementations, when the display unit displays the N preset fingerprint prompt patterns in the fingerprint prompt area in turn, display positions of fingerprint prompt patterns displayed adjacent to each other do not overlap at all.

Because the display positions of the fingerprint prompt patterns displayed adjacent to each other do not overlap at all, a same display device is prevented from being lighted up in the fingerprint prompt patterns displayed adjacent to each other.

In some possible implementations, when the display unit displays the N preset fingerprint prompt patterns in the fingerprint prompt area in turn, display positions of the N fingerprint prompt patterns in the fingerprint prompt area do not overlap at all.

Because display positions of a plurality of preset fingerprint prompt patterns do not overlap at all, a same display device is prevented from being lighted up in any round of display. Therefore, using the apparatus provided in this embodiment to display the fingerprint prompt pattern prolongs a service life of the display device in the fingerprint prompt area.

In some possible implementations, colors of adjacent fingerprint prompt patterns in the N fingerprint prompt patterns displayed in turn are different.

Because the colors of the adjacent fingerprint prompt patterns are different, display statuses of a same display device are different, so that a service life of the display device is prolonged.

In some possible implementations, a proportion of blue pixels in any one of the N fingerprint prompt patterns is less than a preset value.

Because blue light harms eyes, limiting the proportion of blue pixels in the fingerprint prompt pattern to be less than the preset value protects eyes of a user.

In some possible implementations, the N preset fingerprint prompt patterns are classified into M groups, each group of fingerprint prompt patterns are superimposed to obtain a combination pattern corresponding to each group, and a proportion of an intersection of adjacent combination patterns in the fingerprint prompt area is less than a preset value.

In some possible implementations, when the display unit displays the N preset fingerprint prompt patterns in the fingerprint prompt area in turn, there is visually no obvious shape difference in the fingerprint prompt patterns displayed adjacent to each other. In this way, it is uneasy for the user to observe a difference in fingerprint prompt patterns when the user observes a display.

According to a third aspect, an embodiment of this application discloses a fingerprint on display unlocking method. The method includes the following steps:

in response to an unlocking operation of a user, displaying a fingerprint prompt pattern in a fingerprint prompt area of a display according to the method mentioned in any one of the first aspect and the possible implementations of the first aspect;

obtaining a first fingerprint image in the fingerprint prompt area by using a fingerprint on display module;

matching the first fingerprint image with a prestored fingerprint image used for unlocking; and if the matching succeeds, performing an unlocking operation; or if the matching fails, displaying the fingerprint prompt pattern in the fingerprint prompt area according to the method mentioned in any one of the first aspect and the possible implementations of the first aspect.

According to a fourth aspect, an embodiment of this application discloses a terminal device, including a display, a fingerprint on display module, a memory, a processor, and a bus. The display, the fingerprint on display module, the memory, and the processor are connected by using the bus.

The display is configured to display a fingerprint prompt pattern in a fingerprint prompt area.

The fingerprint on display module is configured to obtain a first fingerprint image in the fingerprint prompt area.

The memory is configured to store a computer program and instructions.

The processor is configured to invoke the computer program and the instructions that are stored in the memory to perform some or all steps of the method in any one of the first aspect and the possible embodiments of the first aspect.

According to a fifth aspect, an embodiment of this application provides a computer-readable storage medium. The computer-readable storage medium stores a computer program corresponding to instructions. When the instructions run on a terminal device, the terminal device performs some or all steps of the method in any one of the first aspect and the possible embodiments of the first aspect.

According to a sixth aspect, an embodiment of this application provides a computer program product. The computer program product includes a computer-readable storage medium storing a computer program. The computer program enables a computer to perform some or all steps of the method in any one of the first aspect and the possible embodiments of the first aspect.

According to the technical solutions provided in the embodiments of this application, when the fingerprint prompt pattern is displayed, a plurality of fingerprint prompt patterns are displayed in turn, and display positions of displaying the plurality of fingerprint patterns in the fingerprint prompt area do not completely overlap. Therefore, when the fingerprint prompt pattern is displayed, a display device that displays the fingerprint prompt pattern is prevented from being always in a lighted state. Therefore, the fingerprint prompt pattern display method provided in this application prolongs a service life of the display device in the fingerprint prompt area.

DESCRIPTION OF EMBODIMENTS

The following clearly and completely describes technical solutions in the embodiments of this application with reference to the accompanying drawings in the embodiments of this application. It is clear that the described embodiments are merely some but not all of the embodiments of this application. All other embodiments obtained by a person of ordinary skill in the art based on the embodiments of this application without creative efforts shall fall within the protection scope of this application.

A fingerprint prompt pattern display method provided in the embodiments of this application includes: obtaining a first trigger instruction, where the first trigger instruction is used to instruct to display a fingerprint prompt pattern; and displaying N preset fingerprint prompt patterns in a fingerprint prompt area in turn, where display positions of displaying the N fingerprint prompt patterns in the fingerprint prompt area do not completely overlap, and N is an integer greater than or equal to 2.

In some possible embodiments, the fingerprint prompt pattern display method may be applied to a scenario such as fingerprint on display unlocking. The fingerprint on display unlocking may include the following steps: in response to an unlocking operation of a user, displaying a fingerprint prompt pattern in a fingerprint prompt area of a display according to the foregoing fingerprint prompt pattern display method; obtaining a fingerprint image in the fingerprint prompt area by using a fingerprint on display module; matching the obtained fingerprint image with a prestored fingerprint image used for unlocking; and if the matching succeeds, performing an unlocking operation; or if the matching fails, displaying the fingerprint prompt pattern in the fingerprint prompt area according to the foregoing fingerprint prompt pattern display method.

In the embodiments of this application, a terminal device using the fingerprint prompt pattern display method may be an electronic device that has a display and a fingerprint processing function, for example, a mobile phone (or referred to as a "cellular" phone), a smartphone, a portable wearable device (for example, a smart watch), a tablet computer, a personal computer (PC, Personal Computer), or a PDA (Personal Digital Assistant, personal digital assistant). The smartphone (simply referred to as a mobile phone below) is used as an example for description.

Figure 1A:
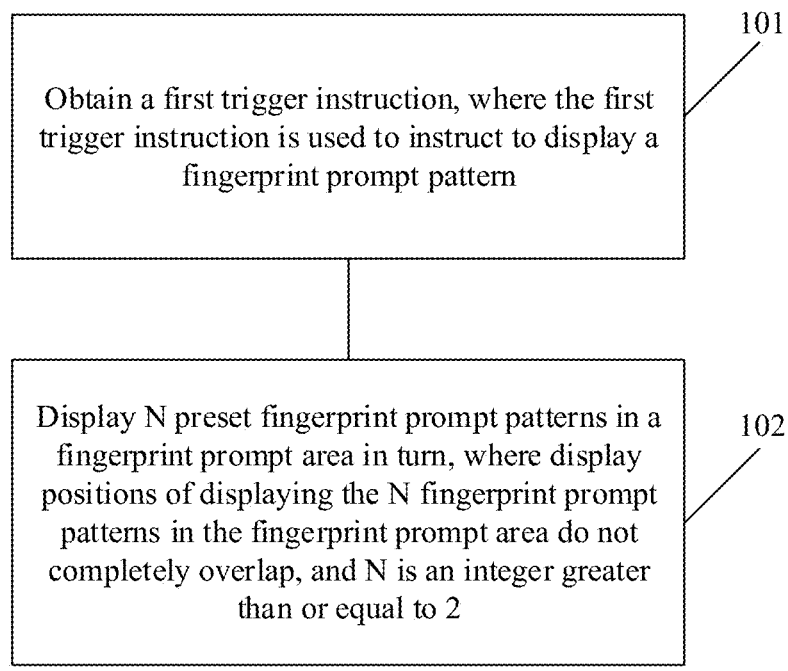
FIG. 1A is a schematic flowchart of a fingerprint prompt pattern display method according to an embodiment of this application.
Figure 1B:
FIG. 1B is a schematic diagram of a fingerprint prompt pattern displayed in a fingerprint prompt area according to an embodiment of this application.
Figure 1C:
FIG. 1C is a schematic diagram of another fingerprint prompt pattern displayed in a fingerprint prompt area according to an embodiment of this application.
Figure 1D:
FIG. 1D is a schematic diagram of another fingerprint prompt pattern displayed in a fingerprint prompt area according to an embodiment of this application.
Figure 1E:
FIG. 1E is a schematic diagram of another fingerprint prompt pattern displayed in a fingerprint prompt area according to an embodiment of this application.

FIG. 1A is a schematic flowchart of a fingerprint prompt pattern display method according to an embodiment of this application. In this embodiment, the method is performed by a processor, and may include the following steps.

Step 101: Obtain a first trigger instruction, where the first trigger instruction is used to instruct to display a fingerprint prompt pattern.

In some possible embodiments, the first trigger instruction may be triggered by lifting a mobile phone by a user, or may be triggered by tapping a screen of a mobile phone by a user, or an operation of triggering the first trigger instruction may be predefined as required. This is not limited herein. The first trigger instruction is used to instruct the mobile phone to display a fingerprint prompt pattern, and after the fingerprint prompt pattern is displayed, the user may perform a pressing operation in a fingerprint prompt area corresponding to the fingerprint prompt pattern.

Step 102: Display N preset fingerprint prompt patterns in a fingerprint prompt area in turn, where display positions of displaying the N fingerprint prompt patterns in the fingerprint prompt area do not completely overlap, and N is an integer greater than or equal to 2.

According to the technical solution provided in this embodiment of this application, when the fingerprint prompt pattern is displayed, a plurality of fingerprint prompt patterns are displayed in turn, and display positions of displaying the plurality of fingerprint patterns in the fingerprint prompt area do not completely overlap. Therefore, when the fingerprint prompt pattern is displayed, a display device that displays the fingerprint prompt pattern is prevented from being always in a lighted state. Therefore, the fingerprint prompt pattern display method provided in this application prolongs a service life of the display device in the fingerprint prompt area.

In some possible embodiments, when the N fingerprint prompt patterns are displayed in the fingerprint prompt area, display positions of fingerprint prompt patterns displayed adjacent to each other may partially overlap or may not overlap at all. When the display positions partially overlap, it may be specified that a percentage of an overlap part is less than a preset value. For example, the preset value may be 10%. Taking a spiral fingerprint as an example, when the N fingerprint prompt patterns are designed, an overlap part of adjacent helices used to represent a fingerprint may be designed to be less than 10%.

Figure 1F:
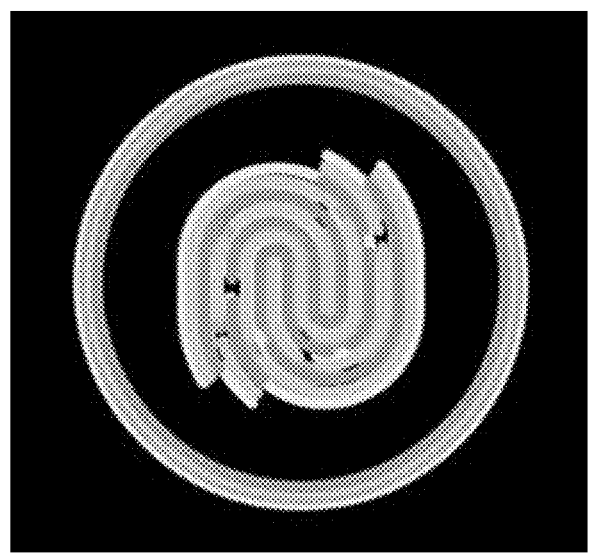
FIG. 1F is a schematic diagram in which the fingerprint prompt patterns in FIG. 1B to FIG. 1E are superimposed together.

In some possible embodiments, when the N fingerprint prompt patterns are displayed in the fingerprint prompt area, display positions do not overlap at all. Taking FIG. 1B to FIG. 1E as examples, these four fingerprint prompt patterns look similar, and have no obvious shape difference visually. In addition, when the four patterns are superimposed together, there is no intersection, as shown in FIG. 1F.

In some possible embodiments, colors of adjacent fingerprint prompt patterns in the N fingerprint prompt patterns displayed in turn are different. For example, the colors of the fingerprint prompt patterns may be displayed from light to dark.

Because the colors of the adjacent fingerprint prompt patterns are different, display statuses of a same display device are different, so that a service life of the display device is prolonged.

Because blue light harms eyes of the user, in some possible embodiments, a proportion of blue pixels displayed in the fingerprint prompt pattern is limited. For example, it may be pre-specified that the proportion of blue pixels displayed in the fingerprint prompt pattern is less than a preset value. For example, it may be pre-specified that the proportion of blue in the fingerprint prompt pattern is less than 5%. A specific proportion is not limited. It may be understood that, alternatively, the fingerprint prompt pattern may not include a blue pixel. In this case, blue light can be prevented from causing harm to the eyes of the user.

In some possible embodiments, the N preset fingerprint prompt patterns may be classified into M groups, each group of fingerprint prompt patterns are superimposed to obtain a combination pattern corresponding to each group, and a proportion of an intersection of adjacent combination patterns in the fingerprint prompt area is less than a preset value. For example, N is 9, M is 3, the preset value is 20%, and nine preset fingerprint prompt patterns are P1, P2, P3, P4, P5, P6, P7, P8, and P9. P1, P2, and P3 constitute one group, and a combination pattern is P1'; P4, P5, and P6 constitute one group, and a combination pattern is P2'; and P7, P8, and P9 constitute one group, and a combination pattern is P3'. An intersection of P1' and P2' is less than 20%, an intersection of P2' and P3' is less than 20%, and an intersection of P3' and P1' is less than 20%.

Figure 2:
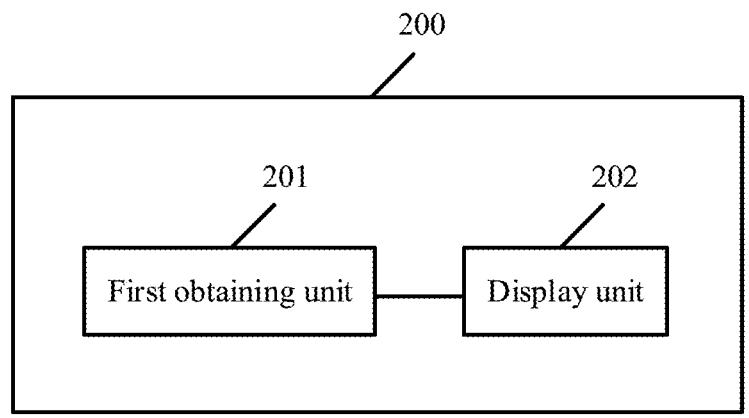
FIG. 2 is a schematic diagram of a structure of a fingerprint prompt pattern display apparatus according to an embodiment of this application.

Referring to FIG. 2, an embodiment of this application further provides a fingerprint prompt pattern display apparatus. As shown in FIG. 2, a fingerprint prompt pattern display apparatus 200 provided in this embodiment of this application includes a first obtaining unit 201 and a display unit 202.

The first obtaining unit 201 is configured to obtain a first trigger instruction, where the first trigger instruction is used to instruct to display a fingerprint prompt pattern. In some possible embodiments, the first trigger instruction may be triggered by lifting a mobile phone by a user, or may be triggered by tapping a screen of a mobile phone by a user, or an operation of triggering the first trigger instruction may be predefined as required. This is not limited herein. The first trigger instruction is used to instruct the mobile phone to display a fingerprint prompt pattern, and after the fingerprint prompt pattern is displayed, the user may perform a pressing operation in a fingerprint prompt area corresponding to the fingerprint prompt pattern.

The display unit 202 is configured to display N preset fingerprint prompt patterns in a fingerprint prompt area in turn, where display positions of displaying the N fingerprint prompt patterns in the fingerprint prompt area do not completely overlap, and N is an integer greater than or equal to 2.

According to the technical solution provided in this embodiment of this application, when a plurality of fingerprint patterns are displayed in the fingerprint prompt area, display positions do not completely overlap. Therefore, when the fingerprint prompt pattern is displayed, the following problem existing when a fingerprint prompt pattern is displayed in a fingerprint display technical solution is avoided because the plurality of fingerprint prompt patterns are displayed in turn: A display device that displays the plurality of fingerprint patterns in the fingerprint prompt area is always in a lighted state. Therefore, using the fingerprint prompt pattern display apparatus provided in this application to display the fingerprint prompt pattern prolongs a service life of the display device in the fingerprint prompt area.

In some possible embodiments, when the display unit 202 displays the N preset fingerprint prompt patterns in the fingerprint prompt area in turn, display positions of fingerprint prompt patterns displayed adjacent to each other do not overlap at all. Because the display positions of the fingerprint prompt patterns displayed adjacent to each other do not overlap at all, a same display device is prevented from being lighted up in the fingerprint prompt patterns displayed adjacent to each other.

In some possible embodiments, when the display unit 202 displays the N preset fingerprint prompt patterns in the fingerprint prompt area in turn, display positions of the N fingerprint prompt patterns in the fingerprint prompt area do not overlap at all. Taking FIG. 1B to FIG. 1E as examples, these four fingerprint prompt patterns look similar, and have no obvious shape difference visually. In addition, when the four patterns are superimposed together, there is no intersection, as shown in FIG. 1F.

In some possible embodiments, when the display unit displays the N preset fingerprint prompt patterns in the fingerprint prompt area in turn, display positions of the N fingerprint prompt patterns in the fingerprint prompt area do not overlap at all.

In some possible embodiments, colors of adjacent fingerprint prompt patterns in the N fingerprint prompt patterns displayed in turn are different. For example, the colors of the fingerprint prompt patterns may be displayed from light to dark.

Because the colors of the adjacent fingerprint prompt patterns are different, display statuses of a same display device are different, so that a service life of the display device is prolonged.

Because blue light harms eyes of the user, in some possible embodiments, a proportion of blue pixels displayed in the fingerprint prompt pattern is limited. For example, it may be pre-specified that the proportion of blue pixels displayed in the fingerprint prompt pattern is less than a preset value. For example, it may be pre-specified that the proportion of blue in the fingerprint prompt pattern is less than 5%. An example proportion is not limited. It may be understood that, alternatively, the fingerprint prompt pattern may not include a blue pixel. In this case, blue light can be prevented from causing harm to the eyes of the user.

In some possible embodiments, the N preset fingerprint prompt patterns may be classified into M groups, each group of fingerprint prompt patterns are superimposed to obtain a combination pattern corresponding to each group, and a proportion of an intersection of adjacent combination patterns in the fingerprint prompt area is less than a preset value. For example, N is 9, M is 3, the preset value is 20%, and nine preset fingerprint prompt patterns are P1, P2, P3, P4, P5, P6, P7, P8, and P9. P1, P2, and P3 constitute one group, and a combination pattern is P1'; P4, P5, and P6 constitute one group, and a combination pattern is P2'; and P7, P8, and P9 constitute one group, and a combination pattern is P3'. An intersection of P1' and P2' is less than 20%, an intersection of P2' and P3' is less than 20%, and an intersection of P3' and P1' is less than 20%.

An embodiment of this application further provides a fingerprint on display unlocking method, including the following steps: in response to an unlocking operation of a user, displaying a fingerprint prompt pattern in a fingerprint prompt area of a display according to the fingerprint prompt pattern display method described in any one of the foregoing embodiments; obtaining a first fingerprint image in the fingerprint prompt area by using a fingerprint on display module; matching the first fingerprint image with a prestored fingerprint image used for unlocking; and if the matching succeeds, performing an unlocking operation; or if the matching fails, displaying the fingerprint prompt pattern in the fingerprint prompt area according to the fingerprint prompt pattern display method described in any one of the foregoing embodiments.

The fingerprint prompt pattern display method may be the fingerprint prompt pattern display method described in any one of the foregoing embodiments. For a specific process, refer to the foregoing descriptions. Details are not described herein again.

Figure 3:
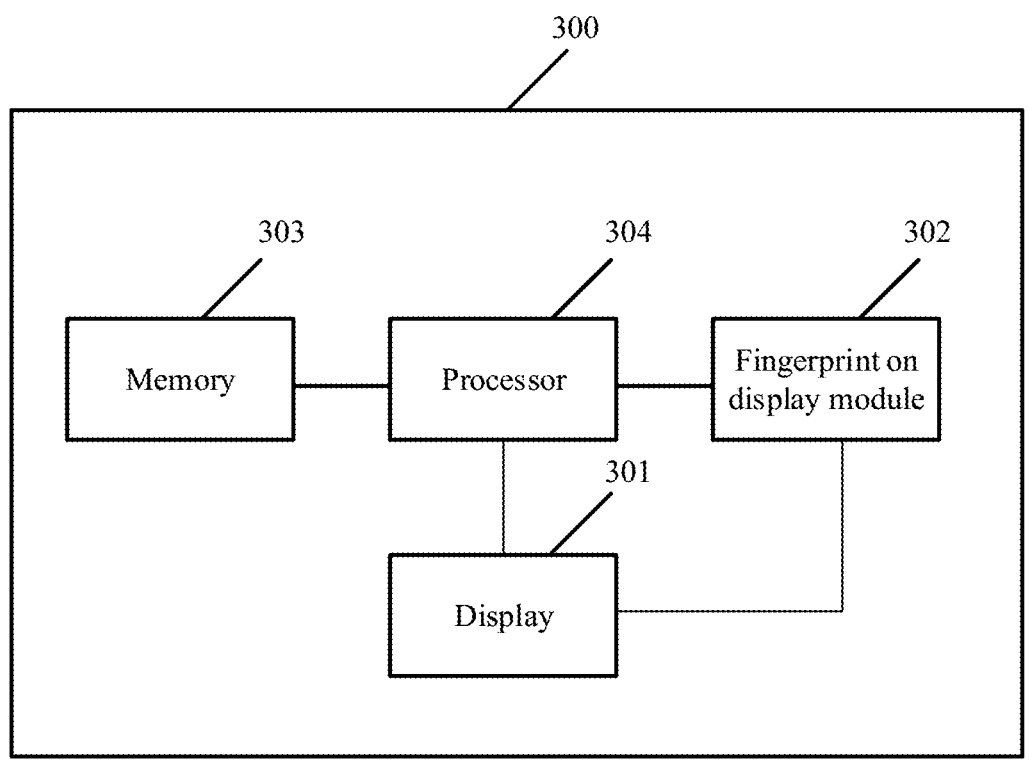
FIG. 3 is a schematic diagram of a structure of a terminal device according to an embodiment of this application.

Referring to FIG. 3, an embodiment of this application further provides a terminal device 300. The terminal device 300 includes a display 301, a fingerprint on display module 302, a memory 303, a processor 304, and a bus. The display 301, the fingerprint on display module 302, the memory 303, and the processor 304 are connected by using the bus.

The display 301 is configured to display a fingerprint prompt pattern in a fingerprint prompt area. The fingerprint on display module 302 is configured to obtain a first fingerprint image in the fingerprint prompt area. The memory 303 is configured to store a computer program and instructions. The processor 304 is configured to invoke the computer program and the instructions that are stored in the memory 303 to perform the method in any one of the foregoing method embodiments.

Figure 4:
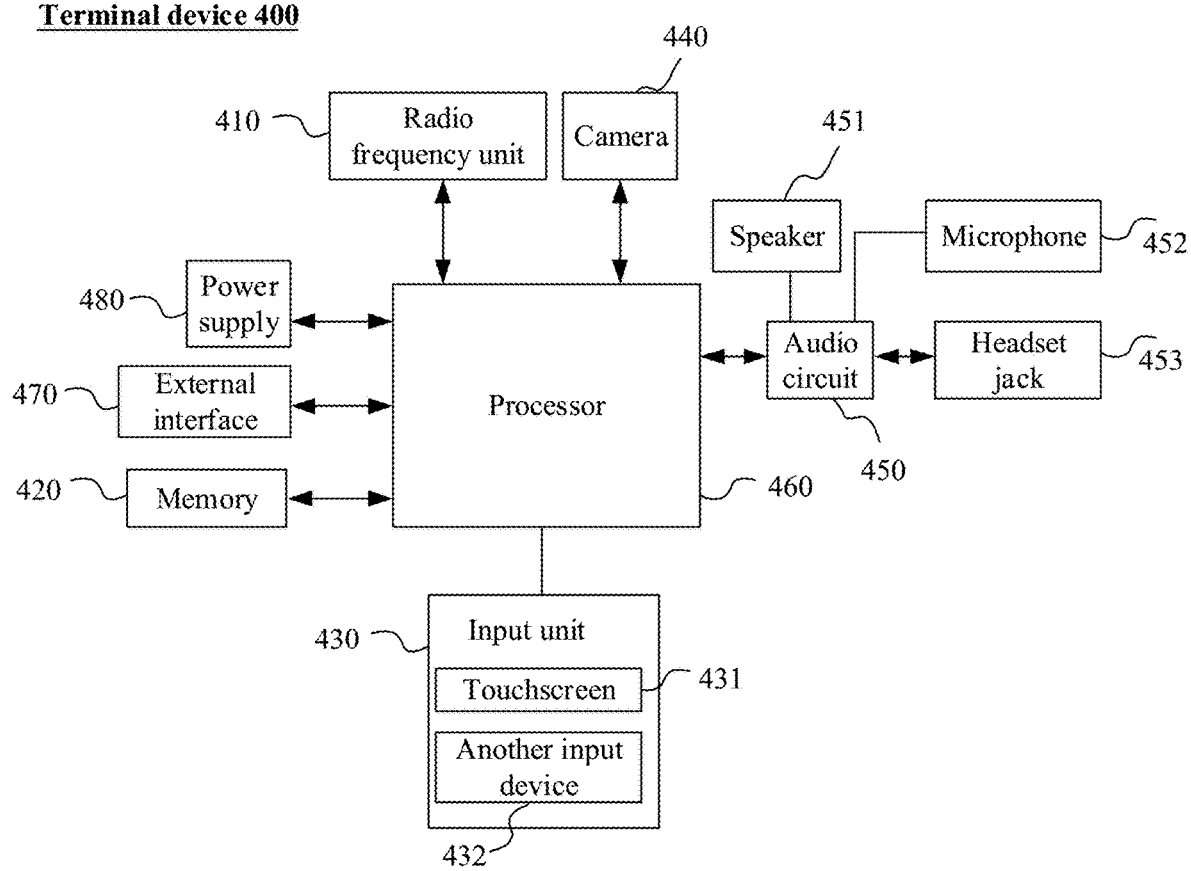
FIG. 4 is a schematic diagram of a structure of a terminal device according to an embodiment of this application.

FIG. 4 is a schematic diagram of a structure of a terminal device according to an embodiment of this application. A terminal device 400 includes a radio frequency unit 410, a memory 420, an input unit 430, a camera 440, an audio circuit 450, a processor 460, an external interface 470, and a power supply 480. The input unit 430 includes a touchscreen 431 and another input device 432, and the audio circuit 450 includes a speaker 451, a microphone 452, and a headset jack 453. The touchscreen 431 may be a display with a touch function. In this embodiment, when a mobile phone is in a standby mode, a user may perform an operation such as tapping the touchscreen 431 or lifting the terminal device 400, and the processor 460 generates a first trigger instruction to instruct to display a fingerprint prompt pattern, and displays a plurality of preset fingerprint prompt patterns in turn by using the display. Display positions of displaying the plurality of fingerprint prompt patterns in a fingerprint prompt area do not completely overlap, and it may be specified that there is no obvious shape difference in the plurality of fingerprint prompt patterns. For example, the fingerprint prompt pattern may be a striped line pattern. During display, a plurality of line images do not completely overlap. In some embodiments, when the plurality of fingerprint prompt patterns are displayed in the fingerprint prompt area, display positions of fingerprint prompt patterns displayed adjacent to each other do not overlap at all. The fingerprint prompt area is an area in which the user obtains user fingerprint information, and is used to prompt the user to input a fingerprint in the fingerprint prompt area. In some possible implementations, the plurality of lines may not overlap except that adjacent line images in the plurality of line images do not overlap. In some possible implementations, when the plurality of fingerprint prompt patterns overlap, an overlap proportion may be less than a preset proportion, for example, less than 10%. In some possible embodiments, colors of adjacent fingerprint prompt patterns in the plurality of fingerprint prompt patterns displayed in turn may be different. To protect eyes, the fingerprint prompt pattern may not include blue, or a proportion of blue is less than a preset value, for example, the proportion of blue is less than 5%. In some possible embodiments, the plurality of fingerprint prompt patterns may be classified into several groups, each group of fingerprint prompt patterns are superimposed to obtain a combination pattern corresponding to each group, and a proportion of an intersection of adjacent combination patterns in the fingerprint prompt area is less than a preset value. It may be understood that, when the plurality of fingerprint prompt patterns are displayed in turn, one fingerprint prompt pattern may be replaced and displayed at a preset time interval. For example, one fingerprint prompt pattern is replaced every 100 milliseconds. The fingerprint prompt patterns may be further displayed after all the fingerprint prompt patterns are displayed, until the user presses the touchscreen to input a fingerprint. The processor matches the fingerprint input by the user with a preset fingerprint image used for unlocking. If the matching succeeds, unlocking is performed. If the matching fails, the fingerprint prompt pattern continues to be displayed in the fingerprint prompt area according to the foregoing method.

An embodiment of this application further provides a computer-readable storage medium. The computer-readable storage medium stores a computer program corresponding to instructions. When the instructions run on a terminal device, the terminal device performs some or all steps of the fingerprint prompt pattern display method or the fingerprint on display unlocking method in any one of the foregoing embodiments.

An embodiment of this application further provides a computer program product. When the computer program product runs on a computer, the computer performs some or all steps of the fingerprint prompt pattern display method or the fingerprint on display unlocking method.

The foregoing specific method examples, explanations and descriptions of technical features in the embodiments, and extensions of a plurality of implementation forms are also applicable to method execution in the apparatus and details are not described in the apparatus embodiments.

It should be understood that division into the modules in the foregoing apparatus is merely logical function division. In actual implementation, some or all of the modules may be integrated into one physical entity, or may be physically separated. For example, each of the foregoing modules may be an independently disposed processing element, or may be integrated on a chip of a terminal, or may be stored in a storage element of a controller in a form of program code. A processing element of a processor invokes and executes a function of each of the foregoing modules. In addition, the modules may be integrated together, or may be implemented independently. The processing element herein may be an integrated circuit chip and has a signal processing capability. In an implementation process, steps in the foregoing method or the foregoing modules may be completed by using a hardware integrated logical circuit in the processor element, or by using instructions in a form of software. The processing element may be a general-purpose processor, for example, a central processing unit (central processing unit CPU), or may be one or more integrated circuits configured to implement the foregoing method, for example, one or more application-specific integrated circuits (application-specific integrated circuit, ASIC), one or more microprocessors (digital signal processor, DSP), or one or more field-programmable gate arrays (field-programmable gate array, FPGA).

It should be understood that, in the specification, claims, and the accompanying drawings of the present invention, the terms "first", "second", and the like are intended to distinguish between similar objects but do not necessarily indicate a specific order or sequence. It should be understood that data termed in such a way is interchangeable in proper circumstances, so that the embodiments described herein can be implemented in other orders than the order illustrated or described herein. In addition, terms "include" and "have" and any other variants thereof are intended to cover the non-exclusive inclusion, for example, a process, method, system, product, or device including a list of steps or modules is not necessarily limited to those clearly listed steps or modules, but may include other steps or modules that are not clearly listed or are inherent to such a process, method, product, or device.

What is disclosed above is merely example embodiments of the present invention, and certainly is not intended to limit the protection scope of the present invention. A person of ordinary skill in the art may understand that all or some of processes that implement the foregoing embodiments and equivalent modifications made in accordance with the claims of the present invention shall fall within the scope of the present invention.

What is claimed is:

1. A method, comprising:
obtaining a first trigger instruction instructing to display a fingerprint prompt pattern;
displaying, in response to the first trigger instruction, N preset fingerprint prompt patterns at respective first display positions in a fingerprint prompt area and in sequence, wherein the N preset fingerprint prompt patterns are displayed on a display of a terminal device to prompt and guide a user to press the first display positions to collect a fingerprint image by the terminal device, wherein the first display positions of the N preset fingerprint prompt patterns comprise different areas on the display, and wherein the N preset fingerprint prompt patterns are fingerprint patterns; and
superimposing the N preset fingerprint prompt patterns to display combination patterns that represent fingerprints, wherein the first display positions of the N preset fingerprint prompt patterns in the fingerprint prompt area do not completely overlap, and wherein N is an integer greater or equal to 2.

2. The method of claim 1, wherein the first display positions are adjacent to each other.

3. The method of claim 1, wherein the first display positions do not partially overlap while displaying the N preset fingerprint prompt patterns in the fingerprint prompt area.

4. The method of claim 1, wherein colors of adjacent fingerprint prompt patterns in the N preset fingerprint prompt patterns are different.

5. The method of claim 1, wherein a proportion of blue pixels in one of the N preset fingerprint prompt patterns is less than a preset value.

6. The method of claim 1, further comprising classifying the N preset fingerprint prompt patterns into M groups, wherein M is an integer greater or equal to zero and less than or equal to N.

7. The method of claim 1, wherein fingerprint prompt patterns displayed adjacent to each other do not comprise a visible shape difference.

8. An apparatus, comprising:
one or more processors configured to obtain a first trigger instruction instructing to display a fingerprint prompt pattern; and
a display coupled to the one or more processors and configured to:
display, in response to the first trigger instruction, N preset fingerprint prompt patterns at respective first display positions in a fingerprint prompt area and in sequence, wherein the N preset fingerprint prompt patterns are displayed on the display to prompt and guide a user to press the respective first display positions to collect a fingerprint image by the one or more processors, wherein the respective first display positions of the N preset fingerprint prompt patterns are different areas on the display, and wherein the N preset fingerprint prompt patterns are fingerprint patterns; and
superimpose the N preset fingerprint prompt patterns to display combination patterns that represent a fingerprint, wherein the first display positions of the N preset fingerprint prompt patterns in the fingerprint prompt area do not completely overlap, and wherein N is an integer greater than or equal to 2.

9. The apparatus of claim 8, wherein the first display positions are adjacent to each other.

10. The apparatus of claim 8, wherein the first display positions do not partially overlap while displaying the N preset fingerprint prompt patterns in the fingerprint prompt area.

11. The apparatus of claim 8, wherein colors of adjacent fingerprint prompt patterns in the N preset fingerprint prompt patterns are different.

12. The apparatus of claim 8, wherein a proportion of blue pixels in one of the N preset fingerprint prompt patterns is less than a preset value.

13. The apparatus of claim 8, wherein the one or more processors are further configured to classify the N preset fingerprint prompt patterns into M groups, and wherein M is an integer greater or equal to zero and less than or equal to N.

14. The apparatus of claim 8, wherein fingerprint prompt patterns displayed adjacent to each other do not comprise a visible shape difference while displaying the N preset fingerprint prompt patterns in the fingerprint prompt area.

15. A method, comprising:
receiving, from a user, a first unlocking operation;
displaying, in response to the first unlocking operation, N preset fingerprint prompt patterns in a fingerprint prompt area of a display, wherein the N preset fingerprint prompt patterns are displayed on the display to prompt and guide the user to press respective display positions to collect a first fingerprint image using a fingerprint on display system, wherein the display positions of the N preset fingerprint prompt patterns are different areas on the display, and wherein N is an integer greater than or equal to 2;
obtaining the first fingerprint image in the fingerprint prompt area using the fingerprint on display system;
attempting to match the first fingerprint image with a prestored fingerprint image used for unlocking;
performing a second unlocking operation when matching succeeds;
displaying the N preset fingerprint prompt patterns in the fingerprint prompt area when matching fails, wherein the N preset fingerprint prompt patterns are fingerprint patterns; and
superimposing the N preset fingerprint prompt patterns to display combination patterns that represent a fingerprint.

16. The method of claim 15, wherein the display positions of the N preset fingerprint prompt patterns in the fingerprint prompt area partially overlap.

17. A device, comprising:
a display configured to display, in response to a first unlocking operation, N preset fingerprint prompt patterns in a fingerprint prompt area, wherein the N preset fingerprint prompt patterns are displayed on the display of the device to prompt and guide a user to press respective display positions to collect a first fingerprint image by the device, wherein the display positions of the N preset fingerprint prompt patterns are different areas on the display, and wherein N is an integer greater than or equal to 2;
a fingerprint on display system coupled to the display and configured to obtain the first fingerprint image in the fingerprint prompt area; and
one or more processors coupled to the display and the fingerprint on display system and configured to:
receive, from the user, a second unlocking operation;

attempt to match the first fingerprint image with a prestored fingerprint image used for unlocking;

perform a third unlocking operation when the matching succeeds;

display, using the display, the N preset fingerprint prompt patterns in the fingerprint prompt area when the matching fails, wherein the N preset fingerprint prompt patterns are fingerprint patterns; and superimpose the N preset fingerprint prompt patterns to display combination patterns that represent a fingerprint.

18. The device of claim 17, wherein the display positions of the N preset fingerprint prompt patterns in the fingerprint prompt area partially overlap.

19. The device of claim 17, wherein the display positions of fingerprint prompt patterns displayed adjacent to each other do not overlap while displaying the N preset fingerprint prompt patterns in the fingerprint prompt area.

20. The device of claim 17, wherein the display positions do not partially overlap while displaying the N preset fingerprint prompt patterns in the fingerprint prompt area.

* * * * *